April 28, 1959     Q. A. HANSEN     2,884,106
SYNCHRONIZER UTILIZING COIL SPRING ENGAGING MEMBER
Filed Aug. 3, 1956     7 Sheets-Sheet 1

INVENTOR.
QUINTEN A. HANSEN
BY
Woodhams, Blanchard & Flynn
ATTORNEYS

April 28, 1959        Q. A. HANSEN        2,884,106
SYNCHRONIZER UTILIZING COIL SPRING ENGAGING MEMBER
Filed Aug. 3, 1956        7 Sheets-Sheet 2

INVENTOR.
QUINTEN A. HANSEN
BY
*Woodhams, Blanchard and Flynn*
ATTORNEYS

April 28, 1959     Q. A. HANSEN     2,884,106
SYNCHRONIZER UTILIZING COIL SPRING ENGAGING MEMBER
Filed Aug. 3, 1956     7 Sheets-Sheet 4
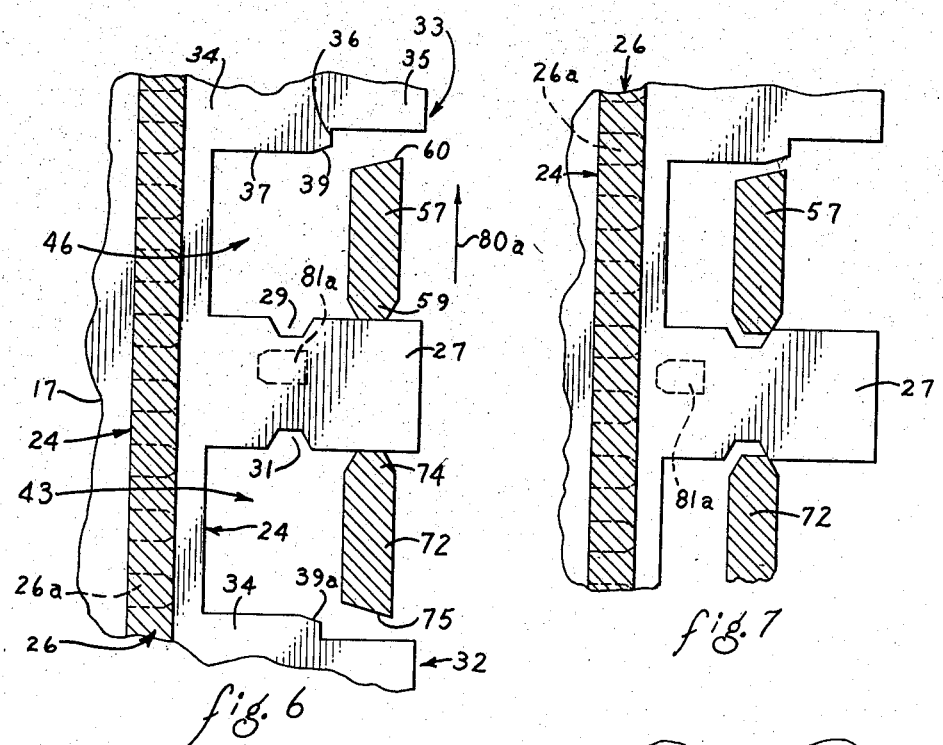
fig. 6
fig. 7
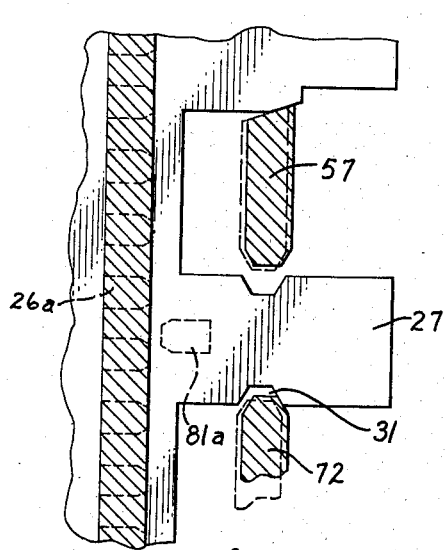
fig. 8
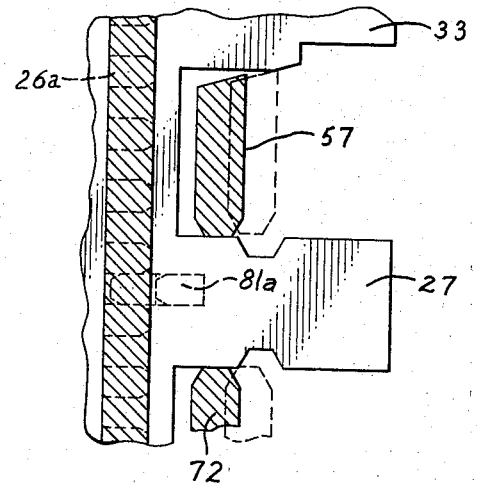
fig. 9
INVENTOR.
QUINTEN A. HANSEN
BY
Woodhams, Blanchard & Flynn
ATTORNEYS April 28, 1959      Q. A. HANSEN      2,884,106
SYNCHRONIZER UTILIZING COIL SPRING ENGAGING MEMBER
Filed Aug. 3, 1956      7 Sheets-Sheet 5

INVENTOR.
QUINTEN A. HANSEN
BY
Woodhams, Blanchard & Flynn
ATTORNEYS

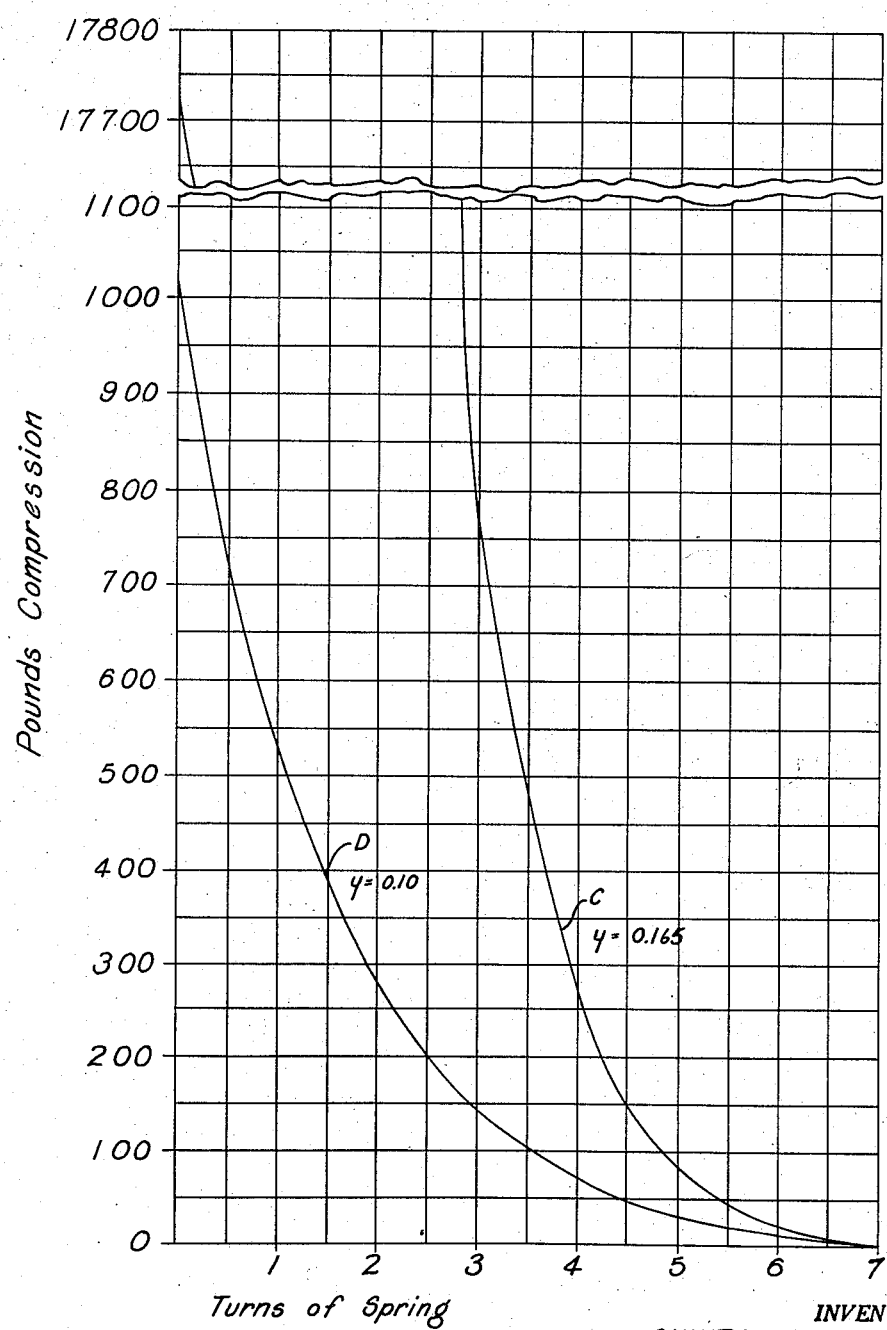

United States Patent Office 2,884,106
Patented Apr. 28, 1959

2,884,106

SYNCHRONIZER UTILIZING COIL SPRING ENGAGING MEMBER

Quinten A. Hansen, Racine, Wis., assignor, by mesne assignments, to Fuller Manufacturing Company, a corporation of Delaware Application August 3, 1956, Serial No. 601,882

16 Claims. (Cl. 192—81)

This invention relates to a synchronizing apparatus for a change gear system and relates particularly to a synchronizing apparatus utilizing a coil spring type clutch, which clutch is self-compensating without material change in the effectiveness of its operation for conditions involving different, and rapidly changing, coefficients of friction.

In the provision of synchronizing devices for change gear systems, it has long been common practice to provide some type of friction clutch means between the interengageable parts for the purpose of bringing same to an equal, or approximately equal, speed prior to their interengagement in order that such interengagement may be accomplished with a minimum of clashing, or other interference, between the interengageable parts. A multitude of specific devices have been proposed for this purpose and many of them are in operation in a substantially satisfactory manner.

However, in pursuance of a constant effort to improve the operation of change gear devices, it has been observed that, insofar as I am aware, all of such previously known devices which involve the use of a friction clutch are sufficiently sensitive to changes in the coefficients of friction between the frictionally engageable parts that when the apparatus is subjected to circumstances causing changes in such coefficients of friction, its operation may be changed materially and it may become quite erratic.

A further problem relating to synchronizing devices is the problem of confining the device in a sufficiently small space that the design of the rest of the equipment is not materially affected by the presence of the synchronizer, and yet it is desirable to have the synchronizing device sufficiently accessible that it can be conveniently reached for servicing and repair.

In the commonly used disk type of synchronizer, of which there are many examples well known to the industry, there is required the presence of relatively large disks, often of a diameter larger than the gears with which they are associated, and this may cause serious space problems, especially where the unit is large and designed for transmitting heavy loads. Alternatively, the cone type of synchronizer is generally small and capable of use without materially changing the design of the associated parts, but it is difficult to reach for repair and/or servicing and it is necessarily, because of its location, often kept sufficiently small that its torque transmitting capacity is severely limited. Thus, while the cone type of synchronizer may be entirely adequate for the relatively light passenger car use, it may become entirely inadequate when applied to use with a heavy duty transmission, such as one applied to trucks, earth moving equipment, cranes or similar equipment.

It is therefore desirable, in addition to providing a synchronizer capable of operating uniformly in spite of substantial variations in coefficient of friction, to provide a synchronizer which has a very large synchronizing capacity but which will require relatively little space for successful operation.

While the well known coil spring type clutch has been previously suggested for use in a synchronizer, such previous use has, insofar as I am aware, been limited to use of the spring element under such conditions as to permit self energizing thereof and, in fact, this was often considered as an advantage of the spring type device. However, when so utilized the spring element will normally engage the element against which it is rotating very tightly and provide an actual clutching operation rather than maintaining itself in a sliding, frictionally engaging, but non-clutching condition with respect thereto. Thus, while this type of device has long been recognized as effective for rapid clutching purposes, attempts to use it for synchronizing purposes have been limted to sufficiently light loads that its rapid action would not place undue strain upon the parts associated therewith.

Accordingly, it has been a principal object of the invention to provide a synchronizing device of the type having frictionally engaging surfaces capable of substantially uniform operation under conditions of varying coefficients of friction between the frictionally engaging surfaces.

A further object of the invention has been to provide such a device wherein uniformity of operation can be maintained within extremely narrow limits in spite of wide changes in coefficients of friction between the frictionally engaging surfaces.

A further object of the invention is to provide a device, as aforesaid, which will operate in a substantially uniform manner even though the coefficient of friction between the frictionally engaging surfaces may vary by as much as 50%.

A further object of the invention has been to provide a device, as aforesaid, which will automatically adjust itself to effect a compensation for changes in effective coefficients of friction.

A further object of the invention has been to provide a device, of the nature aforesaid, having a large frictional engaging capacity but without requiring a prohibitively large space for housing such apparatus.

A further object of the invention has been to provide a device, as aforesaid, in which the diametric dimensional requirements of the device will not be great.

A further object of the invention has been to provide a device, as aforesaid, which can be housed within and by the parts being synchronized without material change in either the shape or size, particularly in the diameter, of such parts and yet which will provide a large synchronizing capacity.

A further object of the invention has been to provide a device, as aforesaid, which can be located with respect to the apparatus with which it operates in such a manner that it is reasonably accessible for service and/or repair.

Other objects and purposes of the invention will become apparent to persons acquainted with devices of this general sort upon a reading of the following disclosure and inspection of the accompanying drawings.

In the drawings:

Figure 6 is a somewhat schematic view showing a plan representation of the position of the certain of the interengaging parts at the start of the shifting operation and taken on a circumferential surface whose radius is indicated by line VI—VI of Figure 1.

Figure 7 is a view of a fragment of Figure 6 but showing said interengaging parts in another position.

Figure 8 is a view of a fragment of Figure 6 showing said interengaging parts in two other positions as the shifting operation progresses, one of the positions of the interengaging parts being shown in broken lines.

Figure 9 is a view of a fragment of Figure 6 showing said interengaging parts in two other positions, the solid line position of said interengaging parts being the final shifted position thereof.

Figures 12 and 12a are graphs showing the compression in a typical spring under typical operating conditions at different locations in the spring and at two widely different, but typical, coefficients of friction.

GENERAL DESCRIPTION

In considering means for meeting the objects and purposes above set forth it should be borne in mind that the coil spring may be provided with an initial pre-loading to cause it constantly to bear against the surface against which it is to work, whether an external or internal surface, with a sufficient but light, constant frictional engagement to initiate the main, operating, engagement when one end of the spring is placed under tension in the case where the spring is external of the drum with which it operates or when such end of the spring is placed under compression where the spring is within an externally positioned shell. Preferably, however, the spring in its inoperative position will be held away from contact with the cooperating surface and hence the first step of a synchronizing action will be to move said spring and surface into contact with each other. In working with both types of these devices, I have recognized that where a coil spring type clutch is impelled at only one end, and the other end remains free, the turns of the coil spring will bear against the part against which it is moving with progressively and rapidly increasing force and will very soon grip rigidly thereagainst. If, however, the end which would otherwise be the free end of the spring is permitted only limited rotative motion with respect to the first mentioned end, the spring will then act merely as a friction member which is capable of changing the value of the frictional force developed at the several points along its length between it and the part against which it is moving, but will not be self energizing to an extent sufficient to permit grabbing.

It should be noted that the references in the present discussion to "movement" of the spring, in view of the fact that the spring in all of its operating conditions bears against the cooperating frictional surface with a definite pressure, refers to the very slight movement which will take place by reason of the stretchability or compressibility of the spring material as the spring is subjected to tension or to compression. Thus, even though the movement is slight, it is a definite movement and may be referred to as such.

Figure 12:
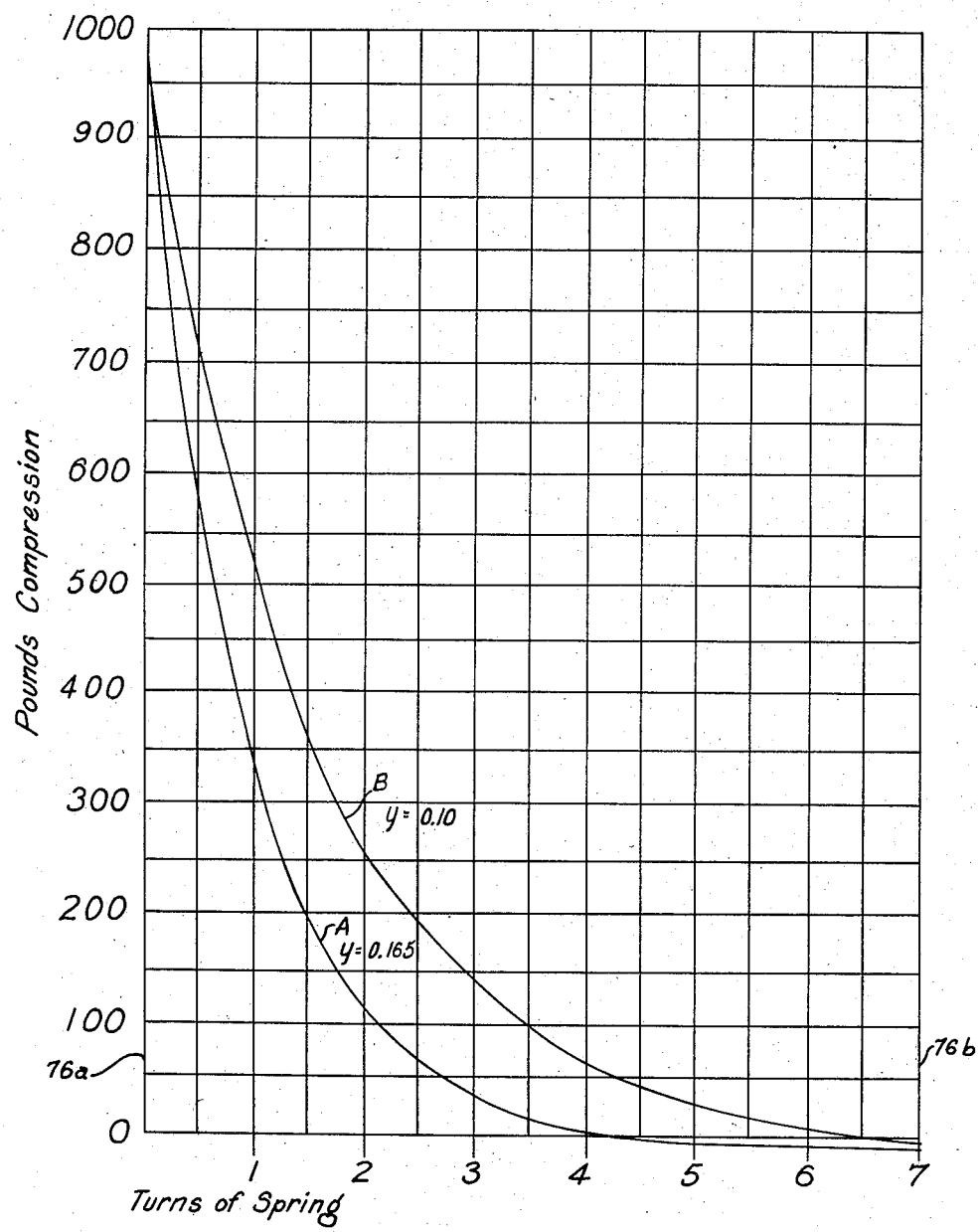

The force conditions within such springs may be shown mathematically by the graph of Figure 12 wherein the abscissa represents the number of turns of a test spring from the end at which the operating force is applied to a given point in the spring, and the ordinates represent the number of pounds of compressive force appearing at a given point within the spring. Lines A and B thereon thus represent the actual compressive force appearing at various points in the spring with two different coefficients of friction between the spring and the surface against which it was working, in this case an externally placed shell. In each of these cases a small tension was applied to what would otherwise have been the free end of the spring.

For purposes of convenient reference hereinafter, the end of the spring at which the operating force is applied, the leftward end 76a as appearing above in Figure 12, will be called the "loaded" end of the spring, while the other end 76b of the spring will be called the "movable" end. Thus, in the conventional self energizing spring the movable end of the spring is permitted unlimited movement whereas, as will be developed more fully hereinafter, in the spring of the present invention the movable end of the spring is permitted only a carefully predetermined limited movement. Further, the terms "rightward," "leftward," "upper" or "lower," and words derived therefrom or of similar import, will unless the context clearly indicates otherwise refer to directions as appearing in the drawings, and the terms "inner" or "outer," and words derived therefrom or of similar import, will unless the context clearly indicates otherwise refer respectively to directions toward and away from the geometric center of the device.

In the case of line A, where the coefficient of friction was 0.165, the spring was under compression to the end of its fourth turn and was accordingly generating a substantial pressure between the spring and the external shell. However, from the end of the fourth turn to the end of the spring it was under a slight tension and thereby tending to be drawn away from the external shell and developing less dragging force between the spring and the external shell than that applied by the pre-loading.

In the case of the example shown by line B, the coefficient of friction was much less, namely 0.10, and even though the same compressive force was applied to the initial end of the spring, most of the spring was under compression and therefore developing a dragging force between it and the surrounding shell. Only the extreme end 76b of the spring was under tension and therefore developing less dragging force than that applied by the preloading.

In neither case was the tension applied sufficient to actually draw the spring away from the surrounding shell.

Lines C and D in Figure 12a show a typical case where the movable end 76b of the spring is free and the spring is permitted to grab.

Examining Figure 12, it will be seen that with a coefficient of friction of 0.165, and with a force of 960 pounds compression applied to what here for discussion purposes may be designated the left end of the spring, there is applied at the right hand end 76b of the spring a total force of approximately twelve pounds tension. Thus, there is a total of 972 pounds developed between the spring and the part frictionally engaged thereby for urging rotation of the spring relative to the part against which it frictionally bears.

With a coefficient of friction of 0.1, and a force applied to the left hand end of the spring of 960 pounds, there is a force at the right hand end 76b of the spring of about two pounds tension. Thus, in this case the total force developed between the spring and the part frictionally engaged thereby urging relative rotation of the spring was 962 pounds. Thus, with over 50% variation in the coefficient of friction between the spring and the part frictionally engaged by it, there was only slightly over 1% change in total force developed between said spring and the part with which it frictionally cooperates.

On the other hand, where the movable end 76b of the spring is free (Figure 12a) and the spring thereby permitted to bed solidly against the part with respect to which it is rotating when in a non-synchronous condition, the force applied at the left hand end of the spring under the same conditions utilized in the above examples may rise as high as seventeen or eighteen thousand pounds for a high coefficient of friction, as 0.165, but may be only a little different than where the righthand end is held (line D, Figure 12a) for a low coefficient of friction, as 0.10.

Since the radial pressure of the spring against the part frictionally engaged by it will be a function of the circumferential force applied thereto, it will be appreciated from lines A and B in Figure 12 that even a wide variation in the coefficient of friction will not materially change the total forces applied to and by each respective end of the spring. Therefore, if the parts are so designed that slippage will take place with a given applied force, such as the force of 960 pounds used in the above example, then the same slippage will take place in spite of widely varying coefficients of friction existing between the rubbing parts.

Detailing the quantitative requirements further, it has been found by mathematical analysis, and checked experimentally, that the following formula correctly represents the force characteristics within a spring of this general nature:

$$P_0+rf_0=E^{\eta\theta}(P+rf_0)$$ in which:

$P_0$ equals the total compressive force applied to the loaded end of the spring, that is, the leftward end of the spring as appearing in Figure 12;
$P$ equals the ordinate at a selected point;
$r$ equals the outside radius of the spring;
$f_0$ equals the initial radial loading force applied to the spring in pounds per inch length of arc of the spring;
$E$ equals the base of natural logarithms;
$\eta$ equals the coefficient of friction;
$\theta$ equals angle in radians from the leftward end of the spring as appearing in Figure 12 to the ordinate for which the equation is being solved.

By placing P equal to zero, and selecting a suitable available force representing $P_0$, it will be possible to solve the equation for theta to determine the number of turns of spring which, for springs of selected size with a known loading and a given coefficient of friction, will represent the point at which the curve appearing in Figure 12 crosses the zero line. Thus, by determining this zero point with a given spring for a number of probable coefficients of friction under given operating conditions, the minimum number of turns for a spring operating under predetermined conditions can be obtained. In the samples used in the embodiments from which Figure 12 was derived, the coefficients of friction were taken to range between 0.10 and 0.165 and under these circumstances, with a spring of convenient diameter for use in an automotive transmission, it was determined that the spring should have at least 7 turns. By inspection of the character of the curve obtained it is apparent, and it was verified by further analysis both mathematical and experimental, that further extension of the spring does not materially alter the operation of the apparatus inasmuch as the curves in question ran practically parallel to the zero line.

Thus, by following the principles above outlined, suitable spring characteristics may be obtained for any desired application.

While the foregoing theoretical explanation of the reason for the operation of the invention has been carefully worked out, thoroughly checked experimentally and is believed to be correct, it should be clearly understood that the substance of the invention, and the workability of the invention, does not depend upon the correctness of such theoretical explanation. Such explanation is offered merely to aid in the better understanding of the invention but the invention resides nevertheless in the structure hereinafter described and claimed and is not dependent on the correctness of the above set forth theoretical analysis.

DETAILED DESCRIPTION

Figure 1:
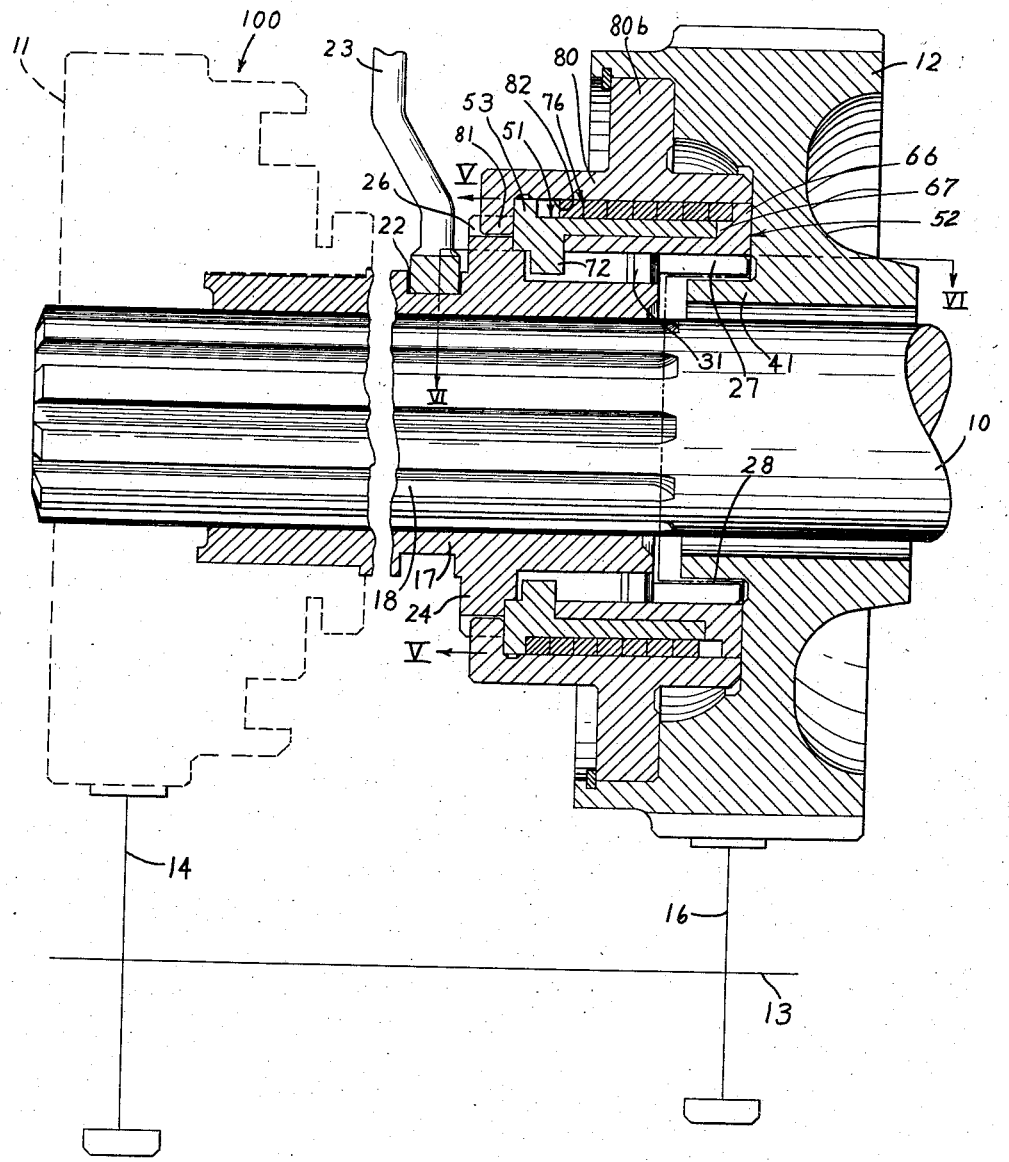
Figure 1 is a view, partially in central section and partially schematic, of a portion of a transmission utilizing the improved synchronizer construction of the present invention.

Referring to Figure 1, in which is illustrated a portion of a transmission, there is shown an output shaft 10 on which gears 11 and 12 are rotatably mounted. Gears 11 and 12 are adapted to be rotated by gears 14 and 16, respectively, which gears are secured to countershaft 13. Said countershaft is adapted to be rotated by the input shaft (not shown) of the transmission in conventional fashion.

The shaft 10 is splined at 18 for axially movable support of a sleeve 17. A shift fork 23 is received with an external groove 22 in sleeve 17. Shift fork 23 is actuable in a conventional manner by a shift lever (not shown) for moving the sleeve 17 axially along the splined portion 18 of shaft 10.

Figure 10:
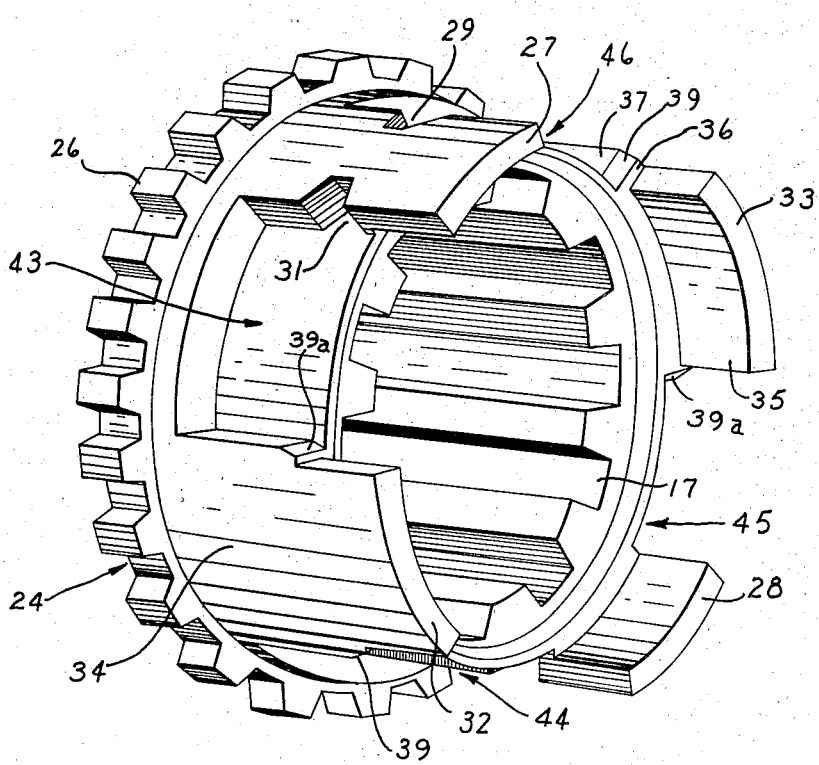
Figure 10 is an oblique end view of the collar and sleeve assembly.

A collar 24 is secured to sleeve 17. A gear 26 is formed on the collar 24 at the leftward end thereof. The collar 24 has a plurality, here two, of arcuate arms 27 and 28 (Figures 1 and 10) extending longitudinally of shaft 10 on opposite sides thereof toward gear 12. The arms 27 and 28 are identical and are provided with a pair of aligned, opposed notches 29 and 31 (Figures 6 and 10) intermediate the ends thereof. The walls of the notches 29 and 31 lie at a relatively small angle with respect to a circumference of the collar, e.g. 30°. This angle is made as shallow as possible to minimize the required axial space but must be sufficient to permit the movements hereinafter described.

The collar 24 is also provided with a pair of arcuate bars 32 and 33 extending longitudinally of shaft 10 toward gear 12 and located between arms 27 and 28. The bars 32 and 33 are identical and each has a relatively wide base 34 (Figures 6 and 10) and a narrower end portion 35 and a step 36. The side wall 37 of the base 34 is tapered at 39 adjacent step 36 to provide a blocking surface. The tapered portion 39 extends from a point slightly rightwardly of the rightward edge of notches 29 and 31, as appearing in Figure 6, to a point slightly leftwardly of the midpoint of said notches for purposes appearing hereinafter. The angle of taper of portion 39 with respect to a circumference of the collar passing through the notches 29 and 31 is relatively large, e.g. 75°. An identical tapered portion 39a is provided on the other side wall of each base 34.

Figure 5:
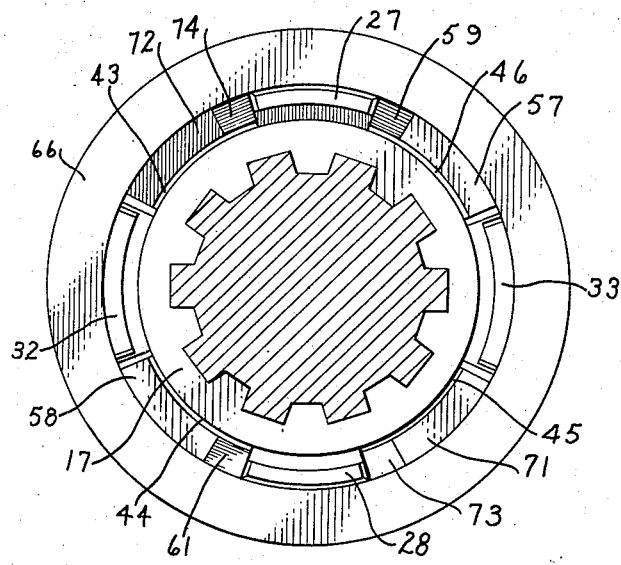
Figure 5 is a sectional view taken along the line V—V of Figure 1.

Arms 27 and 28, and bars 32 and 33 overlie the extension 41 of gear 12. Arms 27 and 28 and bars 32 and 33 define a series of recesses 43, 44, 45 and 46 (Figure 5) for receiving portions of the spring supporting members as discussed in greater detail hereinbelow.

Figure 2:
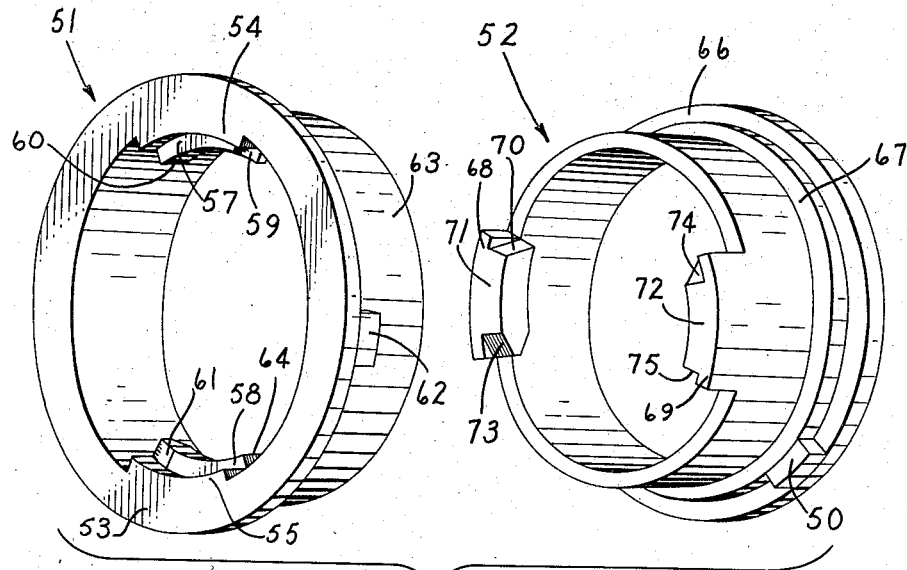
Figure 2 is an exploded oblique view of the spring supporting members.

A pair of telescoping, annular, spring supporting members 51 and 52 (Figures 1 and 2) surround arms 27 and 28, and bars 32 and 33.

Spring supporting member 51 has a flange 53 which is adapted to lie adjacent the side wall of gear 26 (Figure 1). Member 51 also has a pair of bosses 54 and 55 (Figure 2) on the inner surface thereof, said bosses being formed to provide on their radially inward sides a pair of aligned, circumferentially extending cams 57 and 58, respectively. Cams 57 and 58 have head cam surfaces 59 and 61 which are adapted to be received in notches 29 in the arms 27 and 28. The cams 57 and 58 have tapering rear cam surfaces 60 and 64, respectively, which are adapted to contact tapered portion 39 as discussed in greater detail hereinafter. A positioning block 62 (Figure 2) is secured to flange 53 overlying the shank portion 63 of spring supporting member 51.

Figure 3:
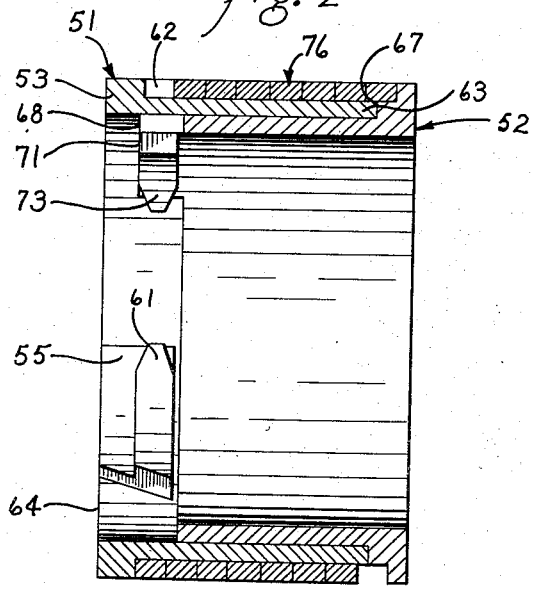
Figure 3 is a sectional view taken along the line III—III of Figure 4.

The second spring supporting member 52 has a flange 66 at one end thereof, said flange having a shoulder 67 (Figure 3) against which the end of the shank portion 63 of member 51 is adapted to abut. A pair of axially directed extensions 68 and 69 are secured to the shank end of member 52. Extensions 68 and 69 have on their radially inward sides cams 71 and 72 formed thereon, respectively, and said cams have tapering head cam surfaces 73 and 74, which are adapted to be received into notches 31 in the arms 27 and 28. The cams 71 and 72 have tapering rear cam surfaces 70 and 75, respectively, for contacting tapering portions 39a. When members 51 and 52 are assembled and the end of member 51 abuts against the shoulder 67, the cams 57, 58, 71 and 72 are circumferentially aligned and are adapted to be moved toward and away from each other by relative rotation of spring supporting members 51 and 52. Member 52 has a positioning block 50 (Figure 2) secured to flange 66, said block being usually circumferentially offset a slight distance from positioning block 62 when the members 51 and 52 are assembled.

Figure 4:
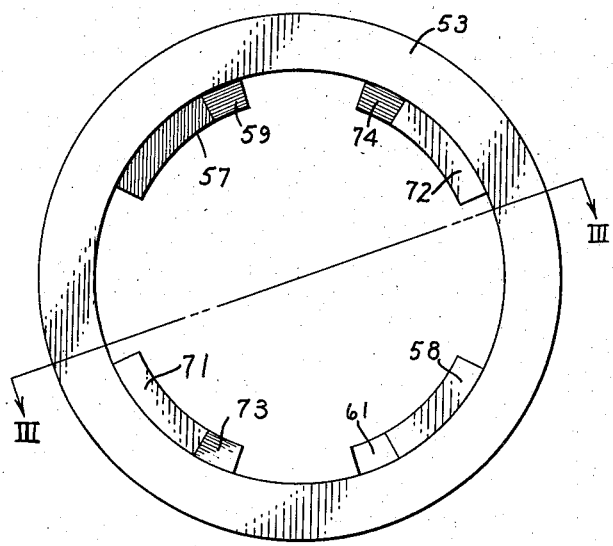
Figure 4 is an end view of the spring supporting members in assembled condition.

A coil spring 76 (Figure 1) surrounds the members 51 and 52 and is normally expanded away from said flange 53. The ends of the spring are circumferentially offset from each other a slight distance when the spring is unstressed. When installed in operating position, its end turns bear against the flanges 53 and 66, respectively. The end of the spring 76, bearing against flange 53, is placed in abutting contact with positioning block 62 while the other end of said spring abuts against block 50. As the spring supporting members 51 and 52 rotate relative to each other, and the cams 57 and 72 and cams 58 and 71, move circumferentially toward and away from each other, the spring will expand or it will be permitted to contract. Thus, as the cams 58 and 71 (Figures 4 and 5) or the cams 57 and 72 (Figures 6 to 9) move toward each other, the spring 76 is expanded and when said cams move away from each other, said spring is tightened.

The spring supporting members 51 and 52 are sleeved around the arms 27 and 28, and the bars 32 and 33. The cams 57, 58, 71 and 72 are snugly received within the recesses 46, 44, 45 and 43, respectively. The recesses are of such size that the cams are capable of a limited amount of both circumferential and axial movement therewithin. Since the spring supporting members 51 and 52 are not secured to the collar 24 and, in operation, move longitudinally thereof, the arms 27 and 28, and the bars 32 and 33, are of such length that the cams 57, 58, 71 and 72 lie therebetween in either terminal position of the sleeve 17 so that the spring supporting members 51 and 52 are at all times guided and supported by the said arms and bars.

The gear 12 has a shell 80 secured thereto by a flange 80b. Said shell 80 surrounds spring 76 and is adapted to be constantly, though lightly, frictionally engaged by spring 76 in all operating positions, or conditions, of said spring. The shell is provided with an internal gear 81 which is adapted to mesh with gear 26 on collar 24.

Figure 13:
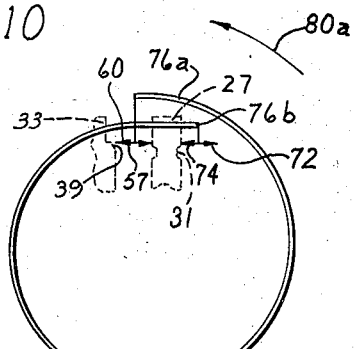
Figure 13 is a diagrammatic illustration of the manner in which the forces are applied to the spring.

Figure 13 is provided to illustrate diagrammatically the functional relationships between the parts imposing forces on the spring. It will be seen that rotation of the shell 80 in the direction indicated by the arrow 80a will urge the loaded end 76a of the spring leftwardly in such a manner that the end cam surface 60 of the cam 57 will bear strongly against the surface 39. The same action on the spring will urge the end cam surface 74 of the cam 72 leftwardly to bear against the rightward side of the member 27. Thus, it will be seen that the reaction by the surface 39 against the cam 57 will impose a compressive force on the loaded end 76a of the spring 76, and the reaction by the member 27 against the cam 72 will impose a tensile force onto the movable end 76b of the spring 76. Thus, it will be understood that the structure above described when in operating condition will impose onto the spring 76 the forces above described and illustrated in Figure 12.

The sleeve 17 has a synchronizer structure 100 at the leftward end thereof for use when gear 11 is to be drivingly connected to shaft 10. The synchronizer structure 100 may be identical in structure with that previously described and, accordingly will not be discussed in detail herein.

OPERATION

Assuming that gear 11 is now drivingly connected to shaft 10 and that the gear 12 is to be drivingly connected to shaft 10, in order to effect such driving connection, gears 26 and 81 must be brought first into synchronism and then into meshing engagement. The shifting operation is initiated by actuation of the shift fork 23 to cause the sleeve 17 to move rightwardly as appearing in Figure 1. At the time that the shifting operation is initiated, the head cam surfaces 59, 61, 73 and 74 of the several cams 57, 58, 71 and 72 will be contacting the side walls of arms 27 and 28, in the end portion thereof closest to gear 12 (Figure 6). In such position, the cams 57, 58, 71 and 72 are spaced from each other a sufficient distance the spring is contracted and held away from frictional contact with surface 82 of shell 80 because arm 27 is wide enough at the point to effect such spacing.

As the sleeve 17 together with arms 27 and 28 moves rightwardly, as appearing in Figure 1, the head cam surfaces 59, 61, 73 and 74 move with respect to the side walls of said arms leftwardly as shown in Figure 6. At the same time the teeth 81a of gear 81, one of which is indicated in broken lines in Figures 6 through 9, move toward the teeth 26a of gear 26. When the arms 27 and 28 have moved a sufficient distance, the head cam surfaces of the cams 57, 58, 71 and 72 move partway into the notches 29 and 31 to the position shown in Figure 7, thereby causing relative rotation of the spring supporting members in such a direction as to permit the spring to expand into frictional contact with the surface 82 of shell 80, said shell 80 being assumed for the purposes of discussion to be rotating in the direction of the arrow 80a with respect to the collar 24. Since the surface 82 and spring 76 are rotating at different speeds and with the spring 76 now in engagement with the shell 80, a sufficient frictional force will immediately develop to urge rotation of the spring and the spring supporting members 51 and 52 relative to collar 24 in the direction of arrow 80a. Member 51 will move in response to this urging until the tapered rear cam surface 60 of cam 57 engages the tapered portion 39, which blocks further movement thereof both circumferentially and axially toward gear meshing position. Thus, the cams 57, 58, 71 and 72 occupy the position shown in solid lines in Figure 8 and pressure is applied to all of them in a circumferential direction contrary to the direction of rotation of shell 80 (arrow 80a). This pressure is compressive at one end of the spring and tensile at the other. Specifically, in this embodiment, following such expansion and subsequent shift of member 51 when the parts assume the position shown in Figure 8, it is apparent that the tapered portion 39 exerts a force on cam 57 in a direction opposite to the direction indicated by the arrow 80a which force is a pushing or compression force tending to cause the spring to expand. This comprises the force at the loaded end 76a of the spring. At the same time the rightward wall of the notch 31 also exerts a force in a direction opposite to that indicated by arrow 80a on cam 72 so long as said cam contacts said wall. This force acting on the other end of spring 76 is a pulling or tension force tending to cause the spring to contract with the force conditions in the spring being as above described and as illustrated in Figure 12. This comprises the force applied at the movable end 76b of the spring.

At this time, the teeth 81a on gear 81 will be close to the teeth 26a of gear 26 but will not enter between adjacent teeth thereon. This last movement of member 51 (Figure 7 position to Figure 8, solid line position) will slightly contract the spring 76 but the amount of such contraction is negligible and a strong frictional contact between the spring 76 and surface 82 still exists when the parts are in the condition illustrated by the solid lines in Figure 8. Such frictional contact will very quickly bring the parts toward synchronism. The collar 24 continues to be urged rightwardly (as appearing in Figures 1 and 6 through 9), against the blocking effect of the cams 57 and 58 thereon. As the parts approach synchronism the blocking force diminishes and the collar 24 will push its surfaces 39 past the opposing cam surfaces 60 and 64 and move further rightwardly relative to cams 57, 58, 71 and 72. Such movement causes the cam 72 to move from contact with the tapered rightward wall of notch 31, as appearing in Figure 8, toward contact with the tapered leftward wall of said notch. During the brief period of time in such movement that the cam is not contacting either of the walls of notch 31, the end 76b of the spring is free from any force applied thereon and the spring becomes self-energizing. This effects a tight gripping of the shell 80 by the spring 76 to complete the synchronizing of the gears. Of course, with the parts already practically synchronized before this occurs, the occurrence of such gripping merely quickens the completing of synchronizing but does not effect shock.

At this time the teeth 81a are close to the teeth 26a on gear 26 but have still not entered between adjacent teeth 26a (Figure 9, broken lines). Further movement of collar 24 will now move the cams 71 and 72 up the ramp provided by the left side of notches 31. This moves the cams 57 and 72, and their counterparts 58 and 71, away from each other and will thereby progressively decrease the amount of frictional contact between spring 76 and surface 82. By the time cam 72 has moved out of notch 31, the gears 26 and 81 are in synchronism and are ready to be easily and silently meshed. Further movement of the collar 24 brings the cams 57, 58, 71 and 72 to the position shown in solid lines in Figure 9 with the teeth 81a of gear 81 in full mesh with the teeth 26a of gear 26. At this time also the cams have moved apart sufficiently that the spring is again fully disengaged from surface 82 and is inoperative. The shift has now been completed.

Considering the movement of the cams 57 and 72 and the effect of such movement on the spring 76 in greater detail, it is intended that the spring frictionally contact and slide on the surface 82 but that the spring should not seize on said surface. Accordingly, it is necessary to control the operation of the spring so that seizing is avoided, regardless of even wide variations in the coefficient of friction between the spring and the surface 82.

It has been observed that the coefficient of friction between a steel coil spring 76 and a steel shell 80 will vary depending upon the operating conditions, details of construction, condition of lubricant, etc., but ordinarily will, in the type of use disclosed herein, lie in the range from about 0.10 to about 0.165. In order to effect the desired amount of frictional engagement between these surfaces, it has been found desirable, in the manner mentioned above in detail, to provide a coil spring having at least seven turns, since the torque which the shell 80 exerts on the spring 76 when seven turns of the spring are contacting said shell is approximately the same regardless of how widely the value of the coefficient of friction varies within the approximate limits discussed above. Other specific numerical relationships may be readily determined by persons acquainted with this general type of apparatus for the meeting of other conditions by the application of the principles set forth above.

Figure 11:
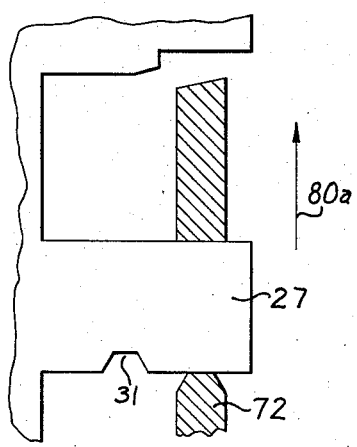
Figure 11 is a schematic fragmentary sketch indicating a modification.

If the force exerted on the cams 57, 58, 71 and 72 acts in a relative direction opposite to that indicated by the arrow 80a, cam 57 will move into notch 29 and cam 72 will engage tapered surface 39a. The operation will otherwise be the same as that previously discussed. Of course, where the operating conditions are such that the motion of the collar 24 with respect to that of the shell 80 is always in the direction indicated by the letter A in Figure 6, then the notches 29 and the blocking surfaces 39a may be omitted (Figure 11).

While the foregoing described embodiment has assumed the cams to be radially inward of the spring and the spring to bear radially outwardly against the shell 80, and, further, that movement of the cams 57 and 72 away from each other will contract the spring against its natural resilience and movement of said cams toward each other will permit the spring to expand against the shell 80 in response to its natural resilience, it will be recognized that this specific arrangement is a matter of choice and has been selected here solely as an illustrative embodiment of the invention. Many obvious variations, including particularly both circumferential and radial reversal of the relationship and mutual operation of the parts, will be apparent to persons acquainted with equipment of this general type and will fall within the scope of the invention.

While the portion of the present invention comprising the spring coil clutch is here shown as applied to a synchronizing device, it will be apparent that said spring clutch may be applied to a wide variety of other uses and, by following the principles herein set forth, it may be applied to such other uses to effect a steady frictional engagement of the parts to be moved simultaneously with each other without effecting an actual seizing between said parts. Many examples of such uses will suggest themselves to those acquainted with the art, such as heavy drum hoists, torque wrenches, automotive clutches, brakes, and many others.

Further, while a specific embodiment of the invention has been shown for illustrative purposes, it will be recognized that many other variations than those herein expressly suggested may be made from the particular form here shown to meet varying operating requirements without departing from the principles of the invention and accordingly the claims hereinafter appended are to be interpreted as including such variations excepting as said claims may by their own terms expressly require otherwise.

I claim:

1. In apparatus for synchronizing the speeds of rotation of a pair of co-axial, rotatable gears upon movement of a shift member, the combination comprising: a pair of coaxial, rotatable gears, means on one of said gears providing a cylindrical surface; a coil spring adapted for frictional engagement with said surface; a shift member; means responsive to movement of said shift member for effecting frictional engagement of said surface by said spring, said last-named means including a pair of elements movable with respect to said gears and engageable, respectively, with the respective ends of said spring; means for moving said elements in the same circumferential direction with respect to said spring and for moving one of said elements with the other so that said elements apply forces to the respective ends of said spring in the same circumferential direction but of different magnitudes, the larger force being sensed to effect said frictional engagement and means responsive to the relative speeds between said gears for releasing said frictional engagement upon attainment of substantial synchronism by said gears.

2. A device for exerting frictional force, comprising in combination: a coil spring; means defining a cylindrical surface coaxial with and substantially coextensive with said coil spring, said surface normally being radially spaced from and out of frictional engagement with said spring; means for applying forces to the ends of said spring, said last named means including two elements engageable, respectively, with the respective ends of said spring, said elements being movable with respect to each other; and means for urging said elements in the same circumferential direction with respect to said spring and for moving one of said elements with respect to the other so that said elements apply forces in the same circumferential direction on the ends of said spring, the force exerted by one of said elements being of greater magnitude than the force exerted by the other element whereby said spring is moved radially into sliding frictional contact with said surface.

3. Apparatus for synchronizing the speeds of rotation of a pair of co-axial, rotatable gears, said gears being mounted on shaft means, including the combination: means on one of said gears defining a cylindrical surface; a coil spring adapted for frictional engagement with said surface; a pair of relatively rotatable elements mounted for rotation with respect to said gears and said shaft means, said rotatable elements being engageable with the opposite ends of said spring; means for rotating said elements in the same direction with respect to said spring circumferentially thereof and for moving one of said elements with respect to the other so that forces of different magnitude are applied in the same circumferential direction on the ends of said spring, the larger force being sensed to effect frictional engagement between said spring and said surface; and means responsive to the relative speeds of said gears for releasing said frictional engagement upon attainment of substantial synchronism of said gears.

4. In apparatus for synchronizing the speeds of rotation of a pair of co-axial, rotatable devices, the combination comprising: means on one of said devices providing a cylindrical surface; a coil spring adapted for frictional engagement with said surface; a pair of elements movable with respect to said devices and with respect to each other, said elements being connected to opposite ends of said spring; a movable actuating mechanism connected to the other of said devices, said elements being movable relative to said actuating mechanism; interengaging means on said actuating mechanism and said pair of elements for causing relative movement of said elements therebetween when said devices move axially with respect to each other, said interengaging means including cam means on each of said elements and cam guiding means on said actuating mechanism, said cam means bearing on said cam guiding means so that said elements move relative to each other and with respect to said actuating mechanism upon movement of said actuating mechanism, said cam and cam guiding means being so shaped that said relative movement causes forces of different magnitude to be exerted on the respective ends of said spring to cause said spring to frictionally engage said surface, said forces being so controlled that said spring is prevented from seizing upon said surface.

5. In apparatus for synchronizing the speeds of rotation of co-axial, rotatable gears, the combination comprising: means on one of said gears providing a cylindrical surface; a coil spring adapted for frictional engagement with said surface; a pair of elements rotatable with respect to said gears and with respect to each other, said elements being connected to opposite ends of said spring; a movable actuating mechanism connected to the other of said gears, said elements being rotatable with respect to said actuating mechanism; cam guiding means on said actuating mechanism; cam following means on each of said elements, said cam following means bearing on said cam guiding means so that said elements are caused to rotate with respect to each other and with respect to said actuating mechanism upon movement of said actuating mechanism, said cam following means and said cam guiding means being shaped to cause forces of different magnitude to be exerted upon the respective ends of said spring to cause said spring to frictionally engage said surface.

6. Apparatus for synchronizing the speeds of rotation of a pair of co-axial, rotatable gears, said gears being mounted on shaft means, including, in combination: a first cylindrical element drivingly connected to one of said gears; a second cylindrical element radially spaced from, and telescoped within, said first element and drivingly connected to said one gear; a coil spring positioned between said first and second elements and being of a radial thickness slightly less than the spacing between said first and second elements, one of said elements being rotatable through an arc of limited extent with respect to said one gear and with respect to said shaft, one end of said spring being connected to said one element; means connected to the other end of said spring and relatively circumferentially movable with respect to said one element and with respect to said gears and said shaft means; and means for rotating said one element with respect to said last named means and with respect to its gear and said shaft means so that forces of different magnitude are applied in the same circumferential direction on the spring.

7. An apparatus according to claim 6 wherein said means connected to the other end of said spring includes a third cylindrical element slidably telescoped within said one element, said third element being drivingly connected to said one gear and being movable through an arc of limited extent with respect to said one gear and said one element; and means axially slidable along said shaft means and means connected to the other gear for rotating said one element and said third element with respect to each other and with respect to said shaft means and said gears.

8. An apparatus for synchronizing the speeds of rotation of a pair of co-axial, relatively shiftable rotatable gears, said gears being mounted on shaft means the combination comprising: means on one of said gears providing a cylindrical surface; a coil spring in sleeved relationship with and adapted for frictional engagement with said surface; a pair of annular, telescoped members secured to opposite ends of said spring, said members being mounted for rotation with respect to each other and with respect to said gears and said shaft means; actuating mechanism connected to the other of said gears, interengaging means on said actuating mechanism and said actuating means on said actuating mechanism and said pair of members for causing relative rotation between said members whereby forces of different magnitude are exerted on the ends of said spring, said interengaging means being so arranged that the forces exerted on the ends of said spring act in the same direction but are varied with respect to each other whereby said spring is caused to frictionally engage but not seize upon said surface.

9. A synchronizer, including in combination: a shaft having a splined portion; a sleeve axially slidable along the splined portion of the shaft, said sleeve having gear teeth thereon; a gear rotatably mounted on said shaft, said gear having gear teeth meshable with the gear teeth on said sleeve; means on said gear defining a cylindrical surface; a coil spring frictionally engageable with said surface; a pair of relatively rotatable elements surrounding, and rotatable with respect to, said shaft and engaging the opposite ends of said spring; interengaging means on said sleeve and on said relatively rotatable elements for causing relative rotation of said elements upon axial sliding movement of said sleeve, said interengaging means being so shaped that said elements exert forces of different magnitude in the same circumferential direction on said spring.

10. An apparatus for synchronizing the speeds of rotation of a pair of gears, said gears being mounted co-axially upon a shaft and one of said gears being shiftable along said shaft, the combination comprising: means on the other of said gears providing an internal cylindrical surface; a coil spring adapted to be expanded into frictional contact with said surface; a pair of telescoping annular members surrounding and spaced from said shaft; said members being relatively rotatable about said shaft; means connecting said members to opposite ends of said spring; circumferentially aligned cams on the interior surfaces of said annular members, said cams being alternately connected to the respective members; an actuating mechanism secured to said one of said gears and movable therewith along said shaft, said actuating mechanism including arms extending longitudinally of said shaft and extending between adjacent cams, said arms being adapted to engage and guide said cams; cam surfaces on said arms engageable with said cams, said cam surfaces being adapted to rotate said members relative to each other in predetermined sequence whereby forces are exerted on opposite ends of said spring to expand said spring into frictional contact with said surface, but without seizing thereon.

11. The combination of claim 8 wherein alternate ones of said arms are formed with opposed aligned notches intermediate the axial ends thereof and wherein the remainder of said arms have tapered surfaces on the side edges thereof in predetermined position with respect to said notches.

12. The combination of claim 11 wherein said notches include inwardly tapering end walls, said walls lying at a relatively small angle with respect to the axis of said notches, said tapered surfaces lying at a relatively large angle with respect to said axis.

13. The device defined in claim 10 wherein the minimum of turns of the spring is determined by solving for $\theta$ in the following formula:

$$P_0 + rf_0 = E^{\eta\theta}(P + rf_0)$$

wherein:

$P_0$ equals the total compressive force applied to the compression end of the spring;

$P$ equals the desired compressive force in the spring at a selected point;

$r$ equals the outside radius of the spring;

$f_0$ equals the initial loading force applied to the spring in pounds per inch length of arc of the spring;

$E$ equals the base of natural logarithms;

$\eta$ equals the coefficient of friction;

$\theta$ equals the angle in radians from the compression end of the spring to said selected point.

14. The device defined in claim 13 wherein P equals zero at a point in the spring wherein theta is a value less than the angular value of the full number of turns in the spring and wherein P has a negative value when $\theta$ equals the total number of turns in a given spring.

15. Apparatus for exerting a controllable frictional force, comprising: a pair of coaxial, rotatable devices mounted on shaft means; means on one of said devices defining a cylindrical surface; a coil spring coaxial with said surface and adapted for frictional engagement therewith, said spring normally being radially spaced from and out of frictional engagement with said surface; a pair of relatively rotatable elements mounted for rotation with respect to said devices and said shaft means, said rotatable elements being engageable with the opposite ends of said spring; means for rotating said elements in the same direction with respect to said spring circumferentially thereof and for moving one of said elements with respect to the other so that forces of different magnitude are applied in the same circumferential direction on the ends of said spring, the larger force being sensed to effect frictional engagement between said spring and said surface.

16. Apparatus for exerting a controllable frictional force, comprising: a pair of coaxial devices mounted upon shaft means; means on one of said devices defining a cylindrical surface; a coil spring in sleeved relationship with and adapted for frictional engagement with said surface, said spring being normally radially spaced from and out of frictional engagement with said surface; a pair of annular, telescoped members engageable with opposite ends of said spring, said members being mounted for rotation with respect to each other and with respect to said devices and said shaft means; actuating mechanism connected to the other of said devices; interengaging means on said actuating mechanism and said pair of members for causing relative rotation between said members whereby forces of different magnitude are exerted on the ends of said spring, said interengaging means being so arranged that the forces exerted on the ends of said spring act in the same direction but are varied with respect to each other whereby said spring is caused to frictionally engage but not seize upon said surface.

References Cited in the file of this patent

UNITED STATES PATENTS

| | | |
|---|---|---|
| 1,857,223 | Vincent et al. | May 10, 1932 |
| 2,001,762 | Blood | May 21, 1935 |
| 2,001,856 | Thomson | May 21, 1935 |
| 2,214,487 | Starkey | Sept. 10, 1940 |